US012586264B2

(12) United States Patent
Shirai et al.

(10) Patent No.: US 12,586,264 B2
(45) Date of Patent: Mar. 24, 2026

(54) WORD EVALUATION VALUE ACQUISITION METHOD, APPARATUS AND PROGRAM

(71) Applicant: NTT, Inc., Tokyo (JP)

(72) Inventors: Yoshinari Shirai, Tokyo (JP); Yasue Kishino, Tokyo (JP); Sanae Fujita, Tokyo (JP); Tessei Kobayashi, Tokyo (JP)

(73) Assignee: NTT, Inc., Tokyo (JP)

( * ) Notice: Subject to any disclaimer, the term of this patent is extended or adjusted under 35 U.S.C. 154(b) by 182 days.

(21) Appl. No.: 18/567,013

(22) PCT Filed: Jun. 11, 2021

(86) PCT No.: PCT/JP2021/022265
§ 371 (c)(1),
(2) Date: Dec. 4, 2023

(87) PCT Pub. No.: WO2022/259513
PCT Pub. Date: Dec. 15, 2022

(65) Prior Publication Data
US 2024/0265588 A1      Aug. 8, 2024

(51) Int. Cl.
*G06T 11/00*      (2006.01)
*G06F 3/04842*      (2022.01)
*G06F 3/048*      (2013.01)

(52) U.S. Cl.
CPC ........ *G06T 11/001* (2013.01); *G06F 3/04842* (2013.01); *G06T 2200/24* (2013.01)

(58) Field of Classification Search
CPC .............. G06T 11/001; G06T 2200/24; G06F 3/04842
See application file for complete search history.

(56) References Cited

U.S. PATENT DOCUMENTS 10,379,618 B2 *    8/2019    Cruz-Hernandez ..... G06T 15/04
2002/0042792 A1 *  4/2002    Nishioka .............. G06F 16/338
                                                707/999.005
(Continued)

FOREIGN PATENT DOCUMENTS

JP        2008204312 A      9/2008
JP        2009521026 A      5/2009
(Continued)

OTHER PUBLICATIONS

Kanasugi et al. (2002) "Selection of a Basic Vocabulary Based on Word Familiarity Ratings" Information Processing Society of Japan, Jul. 16, 2002, vol. 2022, No. 66, pp. 119-124.
(Continued)

*Primary Examiner* — Nicholas Augustine

(57)      ABSTRACT

A word evaluation value acquisition method, including a document display step in which a display unit 300 displays a document composed of a plurality of sentences, a word selection reception step in which an input unit 200 receives selection of a word included in the document, a word evaluation reception step in which the input unit 200 receives an evaluation result indicating any of the plurality of index values with respect to a selected word that is the word whose selection has been received in the word selection reception step, and a decoration step in which the display unit 300 applies a decoration allocated to an index value corresponding to the evaluation result received in the word evaluation reception step to the selected word and a word having the same spelling as the selected word included in the document.

8 Claims, 9 Drawing Sheets

NEWS ARTICLES RELATED TO NEW CORONAVIRUS

The spread of the new coronavirus does not stop. The number of infected people has doubled in Tokyo this month, and the number of infected people is accelerating throughout the country. The government has begun to consider a state of emergency in light of the recent infection situation. The government are planning to convene a meeting of experts and formulate future policies this weekend.

Regarding the situation of coronavirus, Professor XX of XX University has expressed concern that if the situation continues, the spread will not stop and the number of infected people will double within half a month. on the other hand,. .. ..

| 7 | new |
|---|---|
| 6 | coronavirus |
| 5 | infected, infection |
| 4 | |
| 3 | |
| 2 | |
| 1 | |

(56) References Cited

U.S. PATENT DOCUMENTS

| | | | | |
|---|---|---|---|---|
| 2004/0113916 A1* | 6/2004 | Ungar | G09G 5/30 | 345/589 |
| 2005/0203900 A1* | 9/2005 | Nakamura | G06F 16/334 | 707/999.005 |
| 2007/0055688 A1* | 3/2007 | Blattner | G06F 16/258 | 707/999.102 |
| 2007/0176944 A1* | 8/2007 | Brown | G06F 3/0481 | 345/592 |
| 2008/0091634 A1* | 4/2008 | Seeman | G06N 5/022 | 706/59 |
| 2008/0263443 A1 | 10/2008 | Maxime | | |
| 2012/0245936 A1* | 9/2012 | Treglia | G06F 16/685 | 704/235 |
| 2013/0227405 A1* | 8/2013 | Abe | G06F 40/169 | 715/259 |
| 2014/0172417 A1* | 6/2014 | Monk, II | G06F 40/30 | 704/9 |
| 2017/0177180 A1* | 6/2017 | Bachmann | G06F 3/0482 | |
| 2018/0307776 A1* | 10/2018 | Ferradini | G06F 40/143 | |
| 2019/0220504 A1 | 7/2019 | Daniel | | |
| 2020/0301999 A1* | 9/2020 | Co | G06F 40/279 | |
| 2021/0124796 A1* | 4/2021 | Singh | G06T 11/001 | |
| 2021/0342785 A1* | 11/2021 | Mann | G06F 16/258 | |
| 2022/0171924 A1 | 6/2022 | Shirai et al. | | |
| 2022/0180045 A1* | 6/2022 | Loreto | G06F 16/219 | |
| 2022/0358286 A1* | 11/2022 | Wilson-Thomas | G06F 3/0482 | |

FOREIGN PATENT DOCUMENTS

| | | |
|---|---|---|
| JP | 2011013811 A | 1/2011 |
| JP | 2020160515 A | 10/2020 |

OTHER PUBLICATIONS

Fujita et al. (2020) "Comparison of Reinvestigation of Word Familiarity and Past Data," Society of Language Processing, the 26th Annual Conference, Mar. 2020.

* cited by examiner

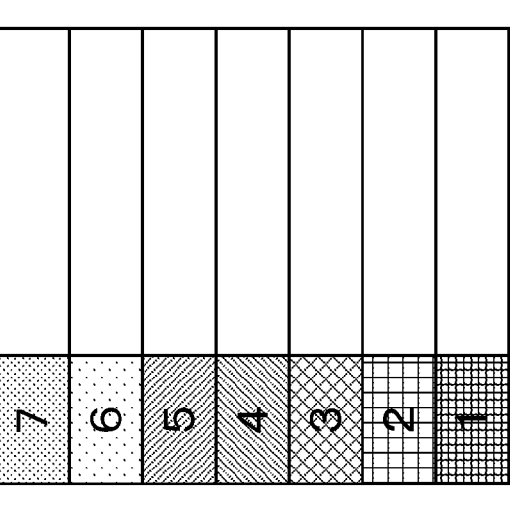

NEWS ARTICLES RELATED TO NEW CORONAVIRUS

The spread of the new coronavirus does not stop. The number of infected people has doubled in Tokyo this month, and the number of infected people is accelerating throughout the country. The government has begun to consider a state of emergency in light of the recent infection situation. The government are planning to convene a meeting of experts and formulate future policies this weekend.

Regarding the situation of coronavirus, Professor XX of XX University has expressed concern that if the situation continues, the spread will not stop and the number of infected people will double within half a month. on the other hand,. . . . . .

Fig. 3

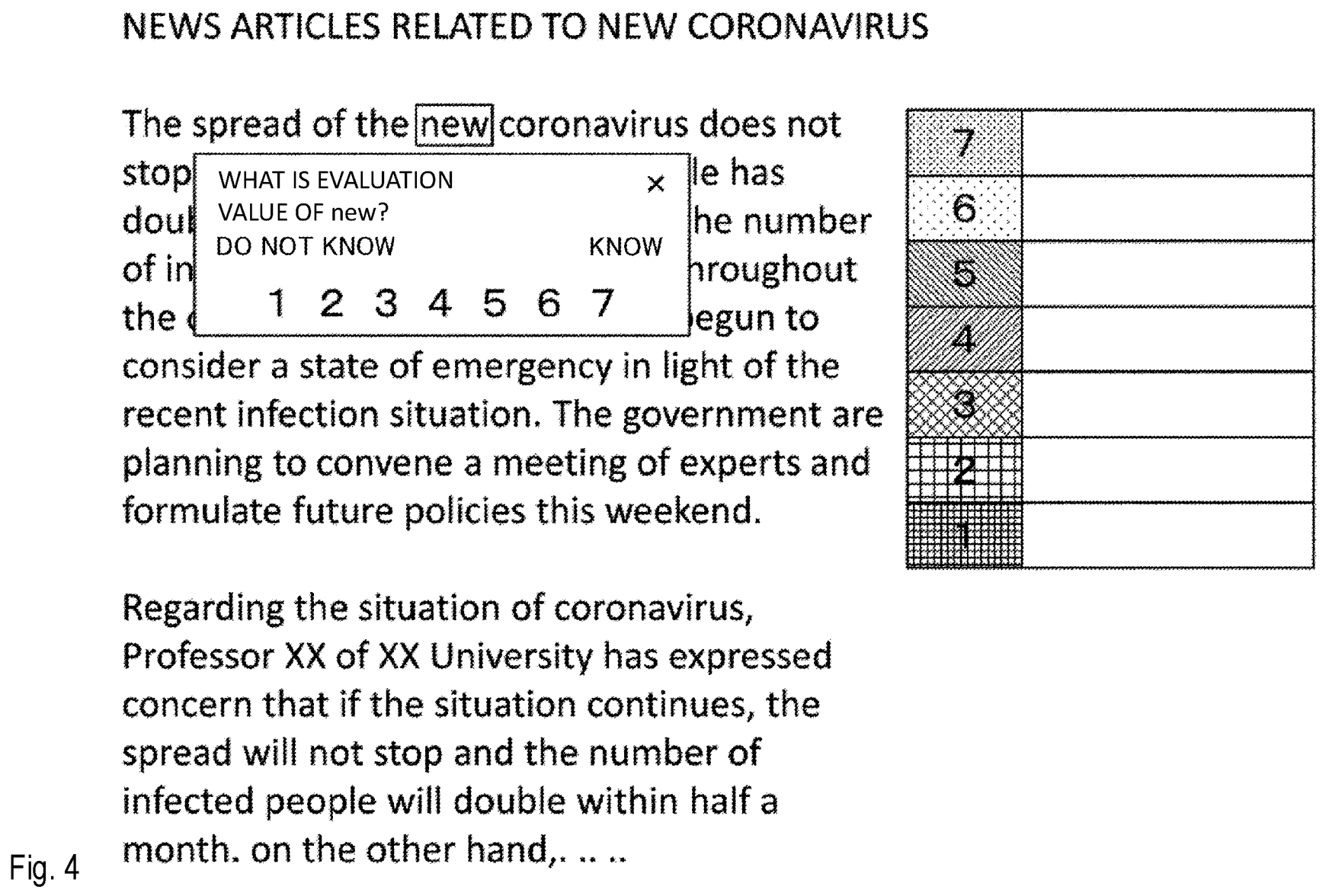

NEWS ARTICLES RELATED TO NEW CORONAVIRUS

The spread of the [new] coronavirus does not stop

WHAT IS EVALUATION                    ×
VALUE OF new?
DO NOT KNOW              KNOW
          1  2  3  4  5  6  7 consider a state of emergency in light of the recent infection situation. The government are planning to convene a meeting of experts and formulate future policies this weekend.

Regarding the situation of coronavirus, Professor XX of XX University has expressed concern that if the situation continues, the spread will not stop and the number of infected people will double within half a month. on the other hand,......

Fig. 4

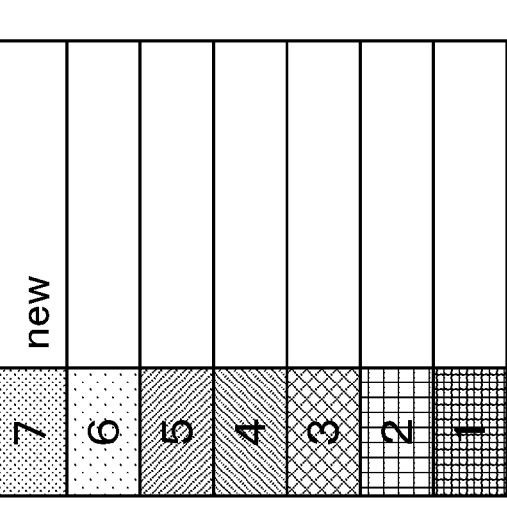

NEWS ARTICLES RELATED TO NEW CORONAVIRUS

The spread of the new coronavirus does not stop. The number of infected people has doubled in Tokyo this month, and the number of infected people is accelerating throughout the country. The government has begun to consider a state of emergency in light of the recent infection situation. The government are planning to convene a meeting of experts and formulate future policies this weekend.

Regarding the situation of coronavirus, Professor XX of XX University has expressed concern that if the situation continues, the spread will not stop and the number of infected people will double within half a month. on the other hand,.. .. ..

Fig. 5

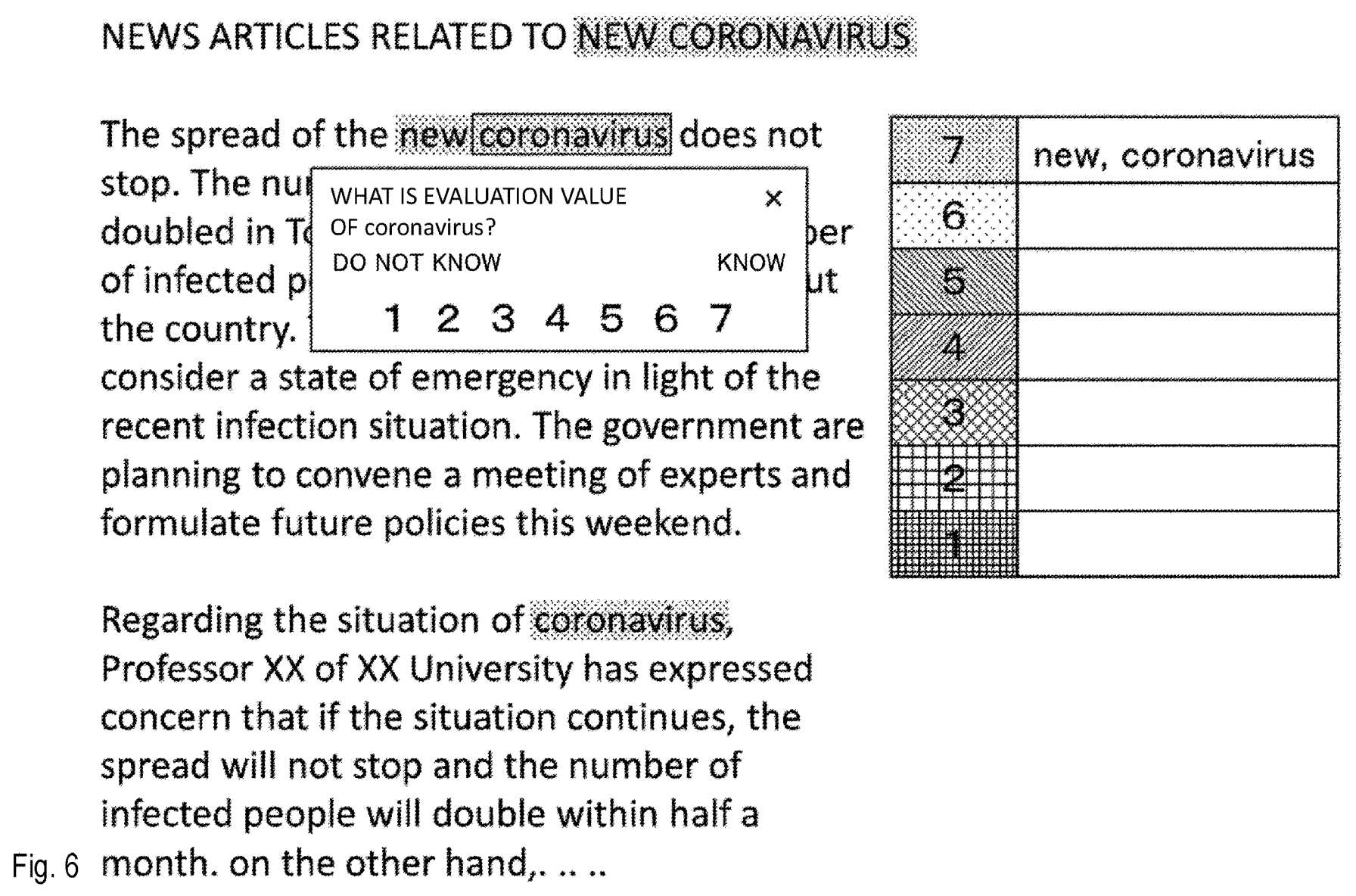

NEWS ARTICLES RELATED TO NEW CORONAVIRUS

The spread of the new coronavirus does not stop. The nu[ ]doubled in T[ ]of infected p[ ]the country.

consider a state of emergency in light of the recent infection situation. The government are planning to convene a meeting of experts and formulate future policies this weekend.

Regarding the situation of coronavirus, Professor XX of XX University has expressed concern that if the situation continues, the spread will not stop and the number of infected people will double within half a month. on the other hand,. .. ..

WHAT IS EVALUATION VALUE OF coronavirus?

DO NOT KNOW    1  2  3  4  5  6  7    KNOW    ×

| 7 | new, coronavirus |
| 6 | |
| 5 | |
| 4 | |
| 3 | |
| 2 | |
| 1 | |

Fig. 6

NEWS ARTICLES RELATED TO NEW CORONAVIRUS

| | | | | | | |
|---|---|---|---|---|---|---|
| 7 | 6 | 5 | 4 | 3 | 2 | 1 |
| new | coronavirus | | | | | |

The spread of the new coronavirus does not stop. The number of infected people has doubled in Tokyo this month, and the number of infected people is accelerating throughout the country. The government has begun to consider a state of emergency in light of the recent infection situation. The government are planning to convene a meeting of experts and formulate future policies this weekend.

Regarding the situation of coronavirus, Professor XX of XX University has expressed concern that if the situation continues, the spread will not stop and the number of infected people will double within half a month. on the other hand,. ... ...

Fig. 7

NEWS ARTICLES RELATED TO NEW CORONAVIRUS

| | |
|---|---|
| 7 | new |
| 6 | coronavirus |
| 5 | infected, infection |
| 4 | |
| 3 | |
| 2 | |
| 1 | |

The spread of the new coronavirus does not stop. The number of infected people has doubled in Tokyo this month, and the number of infected people is accelerating throughout the country. The government has begun to consider a state of emergency in light of the recent infection situation. The government are planning to convene a meeting of experts and formulate future policies this weekend.

Regarding the situation of coronavirus, Professor XX of XX University has expressed concern that if the situation continues, the spread will not stop and the number of infected people will double within half a month. on the other hand,. .. ...

Fig. 8

WORD EVALUATION VALUE ACQUISITION METHOD, APPARATUS AND PROGRAM

CROSS-REFERENCE TO RELATED APPLICATIONS

This application is a U.S. 371 Application of International Patent Application No. PCT/JP2021/022265, filed on 11 Jun. 2021, the disclosure of which is hereby incorporated herein by reference in its entirety.

TECHNICAL FIELD

The present invention relates to a technique for obtaining a word evaluation value which is a value of an index for a word.

BACKGROUND ART

Word familiarity is known as one of indexes for words. Word familiarity is a measure based on a degree of subjective familiarity with a word (refer to NPL 1, for example). Word familiarity is represented by, for example, a numerical value in the range of 1 to 7. For example, a word having no familiarity is represented by a word familiarity close to 1, and a word having familiarity is represented by a word familiarity closer to 7.

The word familiarity of each of words has been determined by subject experiments. In subject experiments, a word is presented to each subject vocally or using characters, and a numerical value representing a degree of subjective familiarity of the word from numerical values of 1 to 7 as an evaluation value is assigned to each subject. A target that is a subject is a person having a certain vocabulary or more. An average of evaluation values assigned by about 40 persons for each word is defined as a value of the word familiarity of each word.

CITATION LIST

Non Patent Literature

[NPL 1] Sanae Fujita, Tessei Kobayashi, "Comparison of reinvestigation of word familiarity and past data," Society of language processing, the 26th Annual Conference, March 2020

SUMMARY OF INVENTION

Technical Problem

However, a word often has a plurality of meanings, and an evaluation value which has been assigned may differ depending on which meaning of a presented word has been called to mind in a subject.

For example, for the word "ceiling," a certain person may recall a boarded portion of an upper part of a room, but a person who is familiar with stock transactions may recall a highest value of a price or a market price. Thus, although the latter person considers that the word "ceiling" to be a highest value of a price or a market price, which is well known to people who perform their own stock transactions, this term is not familiar to the general public, and thus there is a likelihood of a low evaluation value being assigned.

As described above, with respect to a word having ambiguity, there is a likelihood that evaluation values assigned depending on the meanings of the word conceived by individual subjects will be greatly different. As a result, there is a likelihood that a distribution of evaluation values assigned by a plurality of subjects will be high and the word familiarity calculated by averaging a plurality of evaluation values will not correctly represent a degree of familiarity conceived by many people in the world.

An object of the present invention is to provide an acquisition device, a method, and a program for acquiring word evaluation values having a low degree of dependence on ambiguity.

Solution to Problem

According to a word evaluation value acquisition method according to one aspect of the present invention, a word evaluation value acquisition method acquires, from a user, an evaluation result indicating any of a plurality of predetermined index values with respect to indexes for words, for each of words to be evaluated, wherein different decorations are allocated to the plurality of index values, the word evaluation value acquisition method including a document display step in which a display unit displays a document composed of a plurality of sentences, a word selection reception step in which an input unit receives selection of a word included in the document, a word evaluation reception step in which the input unit receives an evaluation result indicating any of the plurality of index values with respect to a selected word that is the word whose selection has been received in the word selection reception step, and a decoration step in which the display unit applies a decoration allocated to an index value corresponding to the evaluation result received in the word evaluation reception step to the selected word and a word having the same spelling as the selected word included in the document, wherein the word selection reception step, the word evaluation reception step, and the decoration step are able to be executed for a plurality of words included in the document.

Advantageous Effects of Invention

A word evaluation value of a word appearing in a document composed of a plurality of sentences such as newspaper articles is acquired from a user using the document. In this case, since the meaning of the word is limited by context, the acquired word evaluation value becomes a word evaluation value of a word having a specific meaning. Accordingly, the word evaluation value having a low degree of dependence on ambiguity can be acquired.

BRIEF DESCRIPTION OF DRAWINGS

FIG. 3 is a flowchart for describing an example of processing of a document display step.

FIG. 4 is a diagram for describing an example of processing of word evaluation reception step.

FIG. 5 is a flowchart for describing an example of processing of a decoration step.

FIG. 6 is a diagram for describing an example of processing of a word reevaluation reception step.

FIG. 7 is a flowchart for describing an example of processing of a redecoration step.

FIG. 8 is a diagram for describing a second modified example.

DESCRIPTION OF EMBODIMENTS

Figure 1:
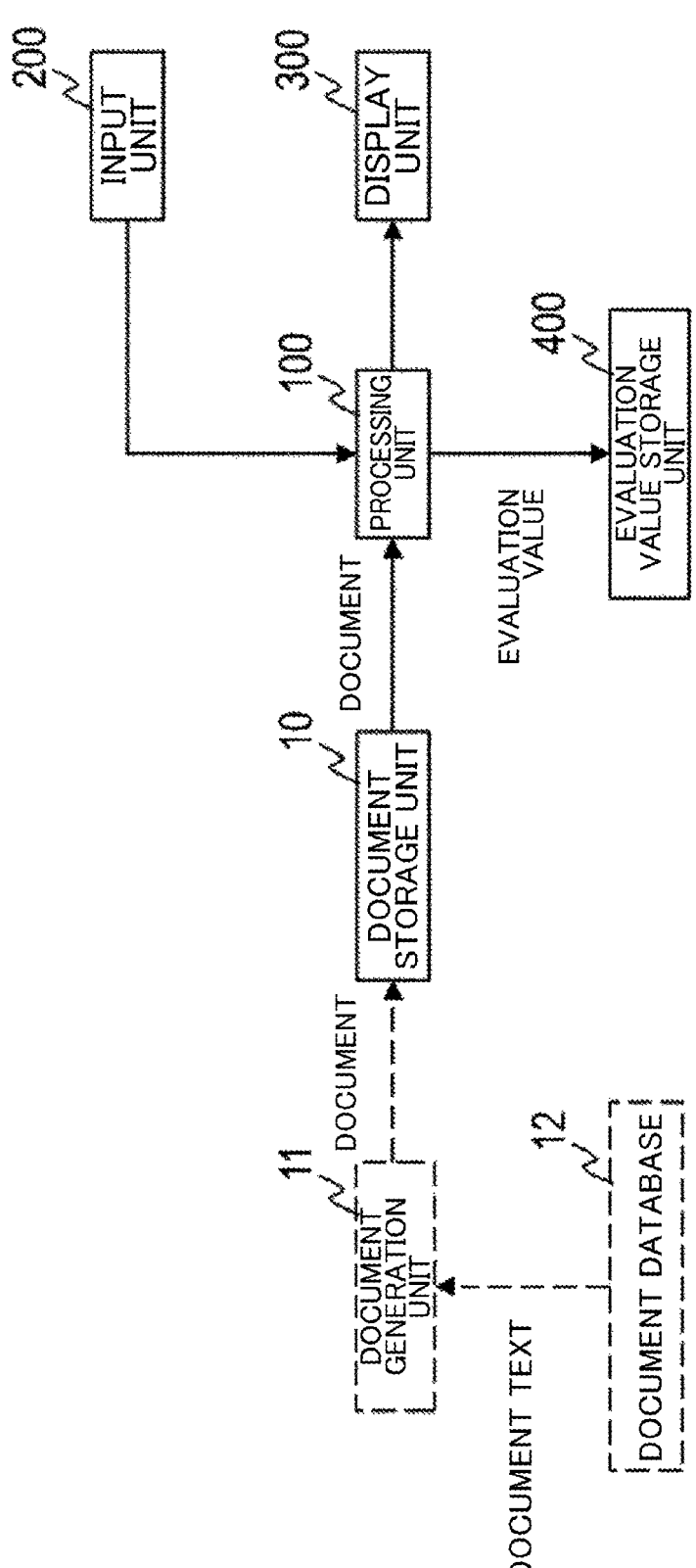
FIG. 1 is a diagram showing an example of a functional configuration of a word evaluation value acquisition device.

Embodiments of the present invention will be described hereinafter in detail. Further, constituent elements with the same function are denoted by the same reference numerals in the diagrams, and overlapping explanations are omitted accordingly.

[Word Evaluation Value Acquisition Device and Method]

As shown in FIG. 1, a word evaluation value acquisition device includes, for example, a document storage unit 10, a document generation unit 11, a document database 12, a processing unit 100, an input unit 200, a display unit 300, and an evaluation value storage unit 400, for example. As will be described later, the word evaluation value acquisition device may not include the document generation unit 11 and the document database 12. Accordingly, in FIG. 1, the document generation unit 11 and the document database 12 are indicated by broken lines.

Figure 2:
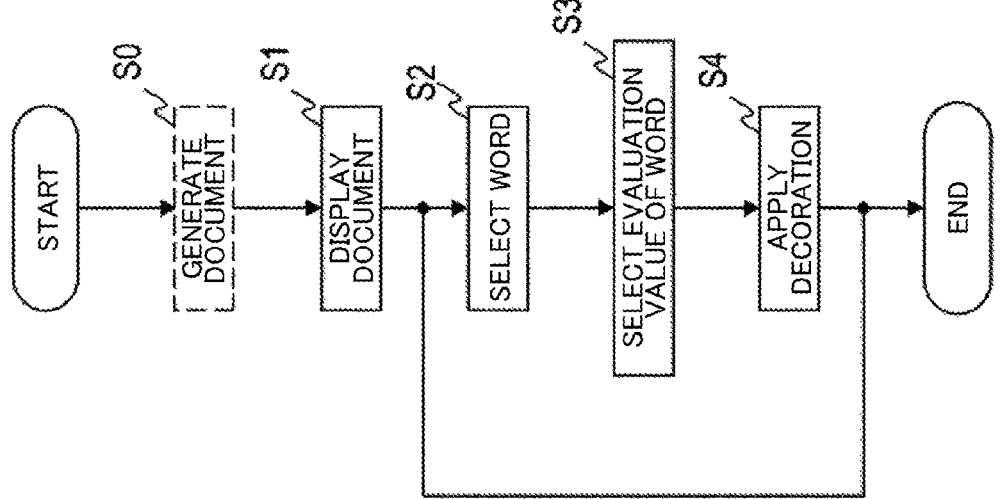
FIG. 2 is a diagram showing an example of a processing procedure of a word evaluation value acquisition method.

A word evaluation value acquisition method is realized, for example, by each component of the word evaluation value acquisition device performing processing of step S0 to step S4 shown in FIG. 2 which will be described below. As will be described later, processing of step S0 may not be performed. Accordingly, processing of step so is indicated by a broken line in FIG. 2.

The processing unit 100 is configured, for example, by a general-purpose or dedicated computer including a processor (hardware processor) such as a central processing unit (CPU), a storage device such as a random access memory (RAM), a read only memory (ROM), and a hard disk, and the like executing a predetermined program. The processing unit 100 performs predetermined processing such as processing for reading a document from the document storage unit 10, processing for receiving an input through the input unit 200, processing for causing the display unit 300 to perform display, and processing for storing an evaluation value in the evaluation value storage unit 400.

The input unit 200 is a user interface which receives input of information from a user. Examples of the input unit 200 include a mouse, a touch sensor, a pointing device such as a touch pad, a keyboard, and the like. As will be described later, the input unit 200 receives selection of a word included in a document, and receives an evaluation value which is an evaluation result indicating any of a plurality of index values with respect to the selected word which is the word whose selection has been received.

The display unit 300 is a user interface that displays information to a user. Examples of the display unit 300 include a liquid crystal display, a projection device, and the like. As will be described later, the display unit 300 displays a document composed of a plurality of sentences, and adds decoration allocated to an evaluation value received by the input unit 200 to a selected word and a word having the same spelling as the selected word included in the document.

Examples of the word evaluation value acquisition device include a desktop personal computer (PC) including a mouse and a liquid crystal display, a laptop PC including a touch pad and a liquid crystal display, a tablet PC including a touch screen (having a touch sensor and a liquid crystal display provided as a single piece of hardware), a smartphone, and the like, but the word evaluation value acquisition device may be a dedicated terminal device.

Hereinafter, operation of the word evaluation value acquisition device of the present embodiment will be described.

The word evaluation value acquisition device starts operation in response to a startup operation performed by a user. The startup operation is, for example, an operation such as pressing a power button, or the like if the word evaluation value acquisition device is a dedicated terminal device, and an operation such as pressing a program icon, specifying an URL, or the like if the word evaluation value acquisition device is a PC. The program icon may be an icon of a program installed in a web browser as an extension function.

<Document Generation Step>

The document generation unit 11 selects document text to be processed from the document database 12 storing text of a plurality of documents and divides the selected document text into words (step S0). The document generation unit 11 divides the document text into words. When the document text is document text in which words are partitioned by spaces such as English, the document generation unit 11 divides the document text into words by partitioning the words by spaces. When the document text is document text having no spaces between words such as Japanese, the document generation unit 11 performs morphological analysis of the document text using a predetermined morphological analysis engine to divide the document text into words.

The information of the document divided into the words generated by the document generation unit 11 is stored in the document storage unit 10.

Document text is document text such as a newspaper article and is composed of a plurality of sentences.

The document generation unit 11 may select document text from a network such as the Internet instead of the document database 12. For example, if the word evaluation acquisition device and method are implemented as a program installed in a web browser as an extension function, when an icon of the program on the web browser is clicked, the document text currently displayed on the web browser may be selected by the document generation unit 11. This is an example of selecting document text from a network such as the Internet.

Hereinafter, when a "document" is simply mentioned, it is assumed that it means information of a document divided into words generated by the document generation unit 11.

The document generation unit 11 may determine some words included in document text as words to be evaluated instead of setting all words included in the document text as words to be evaluated. For example, the document generation unit 11 may exclude words which do not require evaluation values to be obtained, such as a number, a proper noun, and an article, from words to be evaluated. In this case, the information of the document divided into words generated by the document generation unit 11 may include information on the word to be evaluated for each word.

Processing of a document generation step may be performed in real time immediately before processing of a document display step which will be described later, or may be performed in advance before processing of the document display step. When processing of the document generation step is performed in advance before processing of the document display step, the word evaluation acquisition device may not include the document generation unit 11 and the document database 12. In other words, the word evaluation acquisition method may not include processing of the document generation step (step S0). In this case, it is assumed that the information of the document divided into the words generated by the document generation unit 11 is stored in the document storage unit 10.

<Document Display Step>

When the operation is started, first, the word evaluation value acquisition device performs control to cause the display unit 300 to display a document read from the document storage unit 10 by the processing unit 100 on the display unit 300, and the display unit 300 displays the document according to the control (step S1).

FIG. 3 shows an example of a document displayed by the display unit 300. In FIG. 3, an English document is exemplified as a document. Of course, a document may be a document written in a language other than English such as Japanese.

In the present invention, document full text instead of a single word is presented to a user who is a subject. Then, the user assigns any of a plurality of predetermined index values as an evaluation value to each word to be evaluated in the presented document in processing after step S2 which will be described below.

The plurality of predetermined index values are values representing degrees of indexes for a word, for example, values of word familiarity. Word familiarity is a measure based on a degree of subjective familiarity with a word. Hereinafter, as an example, a case where a plurality of predetermined index values and evaluation values assigned by a user are values of word familiarity will be described.

In the example shown in FIG. 3, a list display window for displaying words to which evaluation values have been assigned by the user is displayed on the right side of the document. In this manner, the display unit 300 may display words to which evaluation values have been assigned by the user as a list of words corresponding to index values.

The display unit 300 may apply specific decoration to a word to be evaluated in the document. The display unit 300 may, for example, make a background color of a word to be evaluated gray. By applying specific decoration to a word to be evaluated, the user can easily identify the word to be evaluated, that is, the word selectable by the user, and thus convenience is increased. A word to be evaluated in the document can be determined on the basis of information on the word to be evaluated generated by the document generation unit 11.

<Word Selection Reception Step>

The input unit 200 receives selection of a word included in a document (step S2).

For example, when the input unit 200 is a pointing device, the user can select a word to which the user wants to assign an evaluation value by clicking a cursor on the word. In this manner, the input unit 200 receives selection of the word.

Hereinafter, a word whose selection has been received in the word selection reception step as step S2 is called a selected word.

Information on the selected word whose selection has been received by the input unit 200 is input to the processing unit 100.

<Word Evaluation Reception Step>

The input unit 200 receives an evaluation result indicating any of a plurality of index values as an evaluation value with respect to the selected word (step S3).

For example, when selection of a word is received in the word selection reception step as step S2, a selection display window for inputting an evaluation value of the selected word pops up. An example of the selection display window is shown in FIG. 4. In the example shown in FIG. 4, "new" is a selected word, and the selection display window displays a wording indicating whether an evaluation value of a word should be selected, such as "what is the evaluation value of new?," index values of 1 to 7 (that is, candidate values of the evaluation value), a wording indicating that a higher index value means more "know" and a lower index value means more "don't know," and "x" for closing the selection display window.

For example, when the input unit 200 is a pointing device, the user can select an index value considered to be appropriate (that is, a candidate value of the evaluation value) as an evaluation value by clicking the cursor on the index value. For example, when the input unit 200 is a keyboard, the user can select an index value (that is, a candidate value of the evaluation value) considered to be appropriate as the evaluation value by keystroke.

In this manner, the input unit 200 receives an evaluation result indicating any of a plurality of index values.

The information on the evaluation value received by the input unit 200 is input to the processing unit 100.

The processing unit 100 performs processing for causing the display unit 300 to display a decoration step which will be described below on the basis of the information input from the input unit 200.

<Decoration Step>

The display unit 300 applies a decoration corresponding to the evaluation value received in the word evaluation reception step among decorations allocated to respective index values (that is, a decoration allocated to an index value having the same value as the evaluation value) to the selected word and a word having the same spelling as the selected word included in the document (step S4).

That is, the display unit 300 applies the decoration allocated to the index value corresponding to the evaluation result received in the word evaluation reception step to the selected word and the word having the same spelling as the selected word included in the document.

Different decorations among a plurality of decorations are allocated to a plurality of index values. A decoration to be allocated may be a decoration of a word itself such as the color of the characters of the word, or a decoration that is not the word itself but is related to the word, such as the background color of the word and the background pattern of the word.

That is, the different decorations allocated to the plurality of index values may be decorations that give different colors allocated to the plurality of index values to characters of words, or decorations that use different colors allocated to the plurality of index values as background colors of words.

As background colors of words, colors that allow a user who views the display unit 300 to easily discriminate evaluation values assigned to respective word may be used. For example, when a predetermined number of index values is 7 (that is, there are 7 evaluation values), background colors of red, yellow, green, light blue, blue, purple, and black may be allocated in descending order of index value.

As background colors of words, colors that allow a user who views the display unit 300 can intuitively ascertain the order of evaluation values assigned to respective word may be used. For example, a background color having a longer wavelength may be allocated to a larger index value. For example, when the number of index values is 7, background colors of red, orange, yellow, green, blue, indigo, and purple may be assigned in descending order of index value. On the other hand, a background color of visible light having a longer wavelength may be allocated to a smaller index value.

As an example, a case in which a decoration of a background pattern of dark dots is allocated, to the index value of 7, a decoration of a background pattern of light dots is allocated to the index value of 6, a decoration of a background pattern of diagonal stripes downward to the right is allocated to the index value of 5, a decoration of a background pattern of diagonal stripes upward to the right is allocated to the index value of 4, a decoration of a background pattern of a diamond grid is allocated to the index value of 3, a decoration of a background pattern of a large lattice is allocated to the index value of 2, and a decoration of a background pattern of a small lattice is allocated to the index value of 1 will be described below.

In the case in which decorations are allocated as described above, if the index value of 7 is selected as the evaluation value of the selected word "new" in the example of FIG. 4, the display of the display unit 300 is as shown in FIG. 5.

In the example shown in FIG. 5, the decoration of the background pattern of dark dots (allocated to the index value of 7) corresponding to the evaluation value of 7 is applied not only to the selected word "new" but also to "NEW" which is a word having the same spelling as that of the selected word "new" included in the document. In this manner, a word having the same spelling as the selected word may be a word in which at least one of the characters constituting the selected word has been converted into a capital letter or a small letter.

A word having the same spelling as the selected word may be a word having the same character arrangement as the character arrangement constituting the selected word. For example, a word having the same spelling as the selected word may be a word in which at least one of the characters constituting the selected word has been converted into a half-width letter or a full-width letter, a word in which at least one font of the characters constituting the selected word has been converted into a different font, or a word in which at least one of the characters constituting the selected word has been changed into a different notation in the language to which the word belongs. An example of a word in which at least one of characters constituting a selected word has been changed into a different notation in the language to which the word belongs is a word in which at least one of characters constituting a selected word written in simplified Chinese has been changed into a notation in traditional Chinese.

Since the decoration corresponding to the evaluation value received in the word evaluation reception step (that is, decoration allocated to an index value having the same value as the evaluation value) is applied to the selected word and a word having the same spelling as the selected word included in the document, the burden of the user can be reduced because the user does not need to re-select the same word as the selected word in the document and select an evaluation value.

For each of a plurality of words to be evaluated included in the document, the word selection reception step (step S2), the word evaluation reception step (step S3), and the decoration step (step S4) can be executed.

Therefore, the user can select evaluation values and apply decoration for the plurality of words to be evaluated included in the document by repeating the above-described word selection reception step (step S2), word evaluation reception step (step S3), and decoration step (step S4).

The evaluation value of each word selected by the user is stored in the evaluation value storage unit 400 by the processing unit 100.

In this manner, a word evaluation value of a word appearing in a document is acquired from the user using the document composed of a plurality of sentences. In this case, since the meaning of a word is specified by the context, an acquired word evaluation value becomes a word evaluation value of the word having the specific meaning. Accordingly, a word evaluation value having a low degree of dependence on ambiguity can be acquired.

It should be noted that the present invention does not claim that conventional approaches to assigning word familiarities are incorrect. Word familiarity is an index indicating how much people feel familiarity with a word including a plurality of meanings of the word, and a word familiarity value calculated by averaging according to a conventional method can be regarded as correctly indicating the word familiarity of the word.

An evaluation value of a word selected by the user is visualized by applying a decoration corresponding to the evaluation value selected by the user to the selected word and a word having the same spelling as the selected word included in a document and by displaying a list of words corresponding to each evaluation value selected by the user. Accordingly, at the time of determining an evaluation value of a certain word, evaluation values assigned so far can be looked back.

It is not always necessary for the user to select evaluation values of words from the head of a document. For example, the user can select the evaluation value of 7 for a word perceived to have the evaluation value of 7 first, and then select the evaluation value of 6 for a word perceived to have the evaluation value of 6.

Although an acquired word evaluation value is a word evaluation value of a word having a specific meaning, if it is necessary to collect a word evaluation value of the word used in another meaning, the user may be caused to assign a word evaluation value for a document in which the word is used in the other meaning according to the word evaluation value acquisition device and method.

As described above, a word may have a plurality of meanings. If the same word is used in a different meaning in a document, the document may not be used. Alternatively, processing of removing the word from targets of selection of evaluation values may be performed.

First Modified Example

In the word evaluation value acquisition device and method described above, it is possible to perform re-selection of a word, reception of reevaluation of a word, and re-decoration as described below.

<Word Re-Selection Reception Step>

The input unit 200 receives a selected word or selection of the same word for which the word selection reception step, the word evaluation reception step, and the decoration step have already been executed.

For example, when the input unit 200 is a pointing device, the user can re-select a word to which the user wants to re-assign an evaluation value by clicking a cursor on the word. In this manner, word re-selection is received by the input unit 200.

The same word is a word having the same spelling as the selected word selected in the word selection reception step (step S2) in the document.

Hereinafter, a word whose selection has been received in the word re-selection reception step will be referred to as a re-selected word.

It is also possible to receive re-selection of a word through a list display window which is set on the right side of a document and displays words for which the user has selected evaluation values. For example, when the input unit 200 is a pointing device, the user can re-select a word which is on the list display window and to which the user wants to re-assign an evaluation value by clicking a cursor on the word.

<Word Reevaluation Reception Step>

The input unit 200 receives an evaluation result indicating any of a plurality of index values as an evaluation value of reevaluation with respect to a re-selected word which is a word whose selection has been received in the word re-selection reception step.

For example, when selection of a word is received in a word re-selection reception step, a selection display window for inputting an evaluation value of reevaluation of the re-selected word is popped up. The selection display window may be the same as that popped up in the word evaluation reception step (step S3).

An example of the selection display window is shown in FIG. 6. In the example shown in FIG. 6, the decoration of the background pattern of dark dots corresponding to the evaluation value of 7 has already been applied to a word having the same spelling as the "new," the decoration of the background pattern of dark dots corresponding to the evaluation value of 7 has been applied to a word having the same spelling as "coronavirus," and "coronavirus" is regarded as a re-selected word. In the example of FIG. 6, the selection display window displays a wording indicating whether an evaluation value of reevaluation of a word should be selected, such as "what is the evaluation value of coronavirus?," index values of 1 to 7 (that is, candidate values of the evaluation value), a wording indicating that a higher index value means more "know" and a lower index value means more "don't know," and "x" for closing the selection display window.

For example, when the input unit 200 is a pointing device, the user can select an index value (that is, a candidate value of an evaluation value) considered to be more appropriate as an evaluation value of reevaluation by clicking a cursor on the index value (that is, a candidate value of an evaluation value). For example, when the input unit 200 is a keyboard, the user can select an index value (that is, a candidate value of an evaluation value) considered to be more appropriate as an evaluation value of reevaluation by keystroke.

When the input unit 200 is a pointing device and re-selection of a word has been received through a list display window which is set on the right side of the document and displays a word for which the user has selected an evaluation value, the user can select an evaluation value of reevaluation by dragging and dropping the re-selected word selected by clicking to a frame (that is, a frame corresponding to an index value considered to be more appropriate) where a word having an evaluation value considered to be more appropriate is displayed.

<Re-Decoration Step>

The display unit 300 updates a decoration to be applied to the re-selected word and a word having the same spelling as the re-selected word included in the document to a decoration corresponding to the evaluation value received in the word reevaluation reception step (that is, a decoration allocated to an index value of the same value as the evaluation value).

That is, the display unit 300 updates the decoration to be applied to the re-selected word and the word having the same spelling as the re-selected word included in the document to the decoration allocated to the index value corresponding to the evaluation result received in the word reevaluation reception step.

Processing of the re-decoration step is the same as processing of the decoration step (step S4) except that a "selected word" is replaced with a "re-selected word."

In the example shown in FIG. 6, when the evaluation value of 6 is selected as an evaluation value of the re-selected word "coronavirus," the display of the display unit 300 is as shown in FIG. 7. In the example shown in FIG. 7, the decoration is updated to the decoration of the background pattern of light dots corresponding to the evaluation value of 6 (allocated to the index value of 6) with respect to "coronavirus" and "CORONAVIRUS" which are words having the same spelling as the selected word "coronavirus" included in the document as well as the selected word "coronavirus."

In this manner, similar to a word having the same spelling as a selected word, a word having the same spelling as a re-selected word may be a word in which at least one of the characters constituting the re-selected word has been converted into a capital letter or a small letter. Further, similarly to a word having the same spelling as a selected word, a word having the same spelling as a re-selected word may be a word having the same character arrangement as character arrangement constituting the re-selected word. For example, a word having the same spelling as a re-selected word may be a word in which at least one of the characters constituting the re-selected word has been converted into a half-width letter or a full-width letter, a word in which at least one font of the characters constituting the re-selected word has been converted into a different font, or a word in which at least one of the characters constituting the re-selected word has been changed into a different notation in the language to which the word belongs. An example of a word in which at least one of characters constituting a re-selected word has been changed into a different notation in the language to which the word belongs is a word in which at least one of characters constituting a re-selected word written in simplified Chinese has been changed into a notation in traditional Chinese.

The evaluation value of the word re-selected by the user is stored in the evaluation value storage unit 400 by the processing unit 100.

According to the first modified example, the user can review an evaluation value and easily correct the evaluation value.

For example, although the evaluation value of 7 has been selected when a word "airplane" has appeared first in a document, if the user views "airplane" to which the decoration of the background pattern of dark dots corresponding to the evaluation value of 7 has been applied and think that the evaluation value of 7 is excessively high when the second and third "airplane" appear as the user reads the document, for example, "airplane" can be instantaneously changed to an evaluation value of 6 through processing of the word re-selection reception step, the word reevaluation reception step, and the re-decoration step of modified example 1.

The user selects an evaluation value in consideration of various ways of using a word. Therefore, an evaluation value first selected by the user is not necessarily absolute, and a final evaluation value determined in consideration of various ways of using a word by the user reading a document may be an appropriate evaluation value.

Therefore, it can be said that a more appropriate evaluation value can be obtained by the first modified example.

Second Modified Example

In the above-described word evaluation value acquisition device and method, and the first modified example, a decoration corresponding to an evaluation value received in the word evaluation reception step (that is, decoration allocated to an index value of the same value as the evaluation value) may also be applied to a word corresponding to an inflection of a selected word and/or a word corresponds to the selected word and corresponding a part of speech different from the part of speech of the selected word, included in a document, in the decoration step.

That is, a decoration allocated to an index value corresponding to an evaluation result received in the word evaluation reception step may also be applied to a word corresponding to an inflection of a selected word and/or a word corresponds to the selected word and corresponding a part of speech different from the part of speech of the selected word, included in a document.

Further, in the word evaluation value acquisition device and method, and the first modified example, a decoration applied to a word corresponding to an inflection of a re-selected word and/or a word corresponds to the re-selected word and corresponding a part of speech different from the part of speech of the re-selected word, included in a document, may also be updated to a decoration corresponding to an evaluation value received in the word reevaluation reception step (that is, decoration allocated to an index value of the same value as the evaluation value) in the re-decoration step.

That is, a decoration applied to a word corresponding to an inflection of a re-selected word and/or a word corresponds to the re-selected word and corresponding a part of speech different from the part of speech of the re-selected word included in a document may also be updated to a decoration allocated to an index value corresponding to an evaluation result received in the word reevaluation reception step.

For example, it is assumed that a selected word is "infected" and the evaluation value of 5 has been selected in the word evaluation reception step. In this case, the display of the display unit 300 is as shown in FIG. 8. In FIG. 8, the decoration of the background pattern of diagonal stripes downward to the right which corresponds to the evaluation value of 5 (which is allocated to the index value of 5) is applied to the selected word "infected" and a word "infection" corresponding to the selected word "infected" and corresponding to a part of speech different from the part of speech of the selected word "infected" as well as a word having the same spelling as the selected word "infected" included in the document.

An example of a word corresponding to an inflection of a (re-)selected word is a word "lay" corresponding to the past tense of a (re-) selected word "lie" when the present tense of "lie" is the (re-) selected word. In this example, an inflection is the past tense. Inflection may be a conjugation form other than the past tense such as a base form, a present progressive form, and past participle form or may be the plural form of a noun, the third person singular present tense of a verb, the comparative or superlative of an adjective or an adjective verb, and the like.

When a (re-) selected word is a word of a verb in Japanese, examples of a conjugation form include an imperfective form, a predicative form, an end form, an attributive form, a subjunctive form, and an imperative form.

In this manner, by applying a decoration corresponding to an evaluation value received in the word evaluation reception step (that is, decoration allocated to an index value of the same value as the evaluation value) not only to a (re-) selected word but also to a word corresponding to an inflection of the (re-) selected word and/or a word corresponding to the (re-) selected word and corresponding to a part of speech different from the part of speech of the (re-) selected word, a burden on a user can be reduced and an evaluation value of a word can be more efficiently acquired.

Third Modified Example

In the above-described word evaluation value acquisition device and method, the first modified example, and the second modified example, it is possible to handling an idiom included in document text as an evaluation target instead of handling each of words constituting the idiom as an evaluation target. For example, it is possible to handle "universal unification" included in a document as an idiom of "universal unification" instead of handling it as a word "universal" and a word "unification." Similarly, "take care of" included in a document may be handled as an idiom as it is.

In this case, the document generation unit 11 selects document text to be processed from the document database 12 storing text of a plurality of documents and divides the selected document text into idioms and words other than the idioms (step S0') instead of step S0. The document generation unit 11 divides the document text into idioms and words other than the idioms by performing morphological analysis of the document text using a morphological analysis engine giving priority to idioms, for example. The word evaluation value acquisition device handles idioms as well as words as words in the word evaluation value acquisition device and method and first modified example, and performs processing after step S1 of the word evaluation value acquisition device and method and processing of the first modified example. In this case, since the aforementioned selected word or re-selected word does not correspond to a word but corresponds to an idiom, a word or an idiom corresponding to the selected word may be referred to as a "selected language," and a word or an idiom corresponding to the re-selected word may be referred to as a "re-selected language."

Similarly to the second modified example, in the third modified example, a decoration corresponding to an evaluation value received in the word evaluation reception step (that is, decoration allocated to an index value of the same value as the evaluation value) may also be applied to a language including a word corresponding to an inflection with respect to any word included in a selected language included in a document in the decoration step. Similarly, a decoration applied to a language including a word corresponding to an inflection with respect to any word included in a re-selected language included in a document may also be updated to a decoration corresponding to an evaluation value received in the word reevaluation reception step (that is, decoration allocated to an index value of the same value as the evaluation value) in the re-decoration step.

Other Modified Examples

While embodiments of the present invention have been described above, specific configurations are not limited to the embodiments and, needless to say, the present invention also includes appropriate modifications in design or the like having been made without departing from the spirit and the scope of the present invention.

For example, an index value may be an index for a word other than word familiarity. For example, an index value may be word imageability which is an index regarding easiness of reminding an image corresponding to the meaning of a word, or a word difficulty which is an index regarding the difficulty of a word.

The various types of processing described in the embodiments are not limited to being executed in a time series manner in the described order, and may be executed in parallel or individually in accordance with the processing capability of the device that executes the processing or as required.

For example, data may be directly exchanged between the constituent elements of the word evaluation value acquisition device or may be exchanged via a storage unit which is not illustrated.

[Program and Recording Medium]

Figure 9:
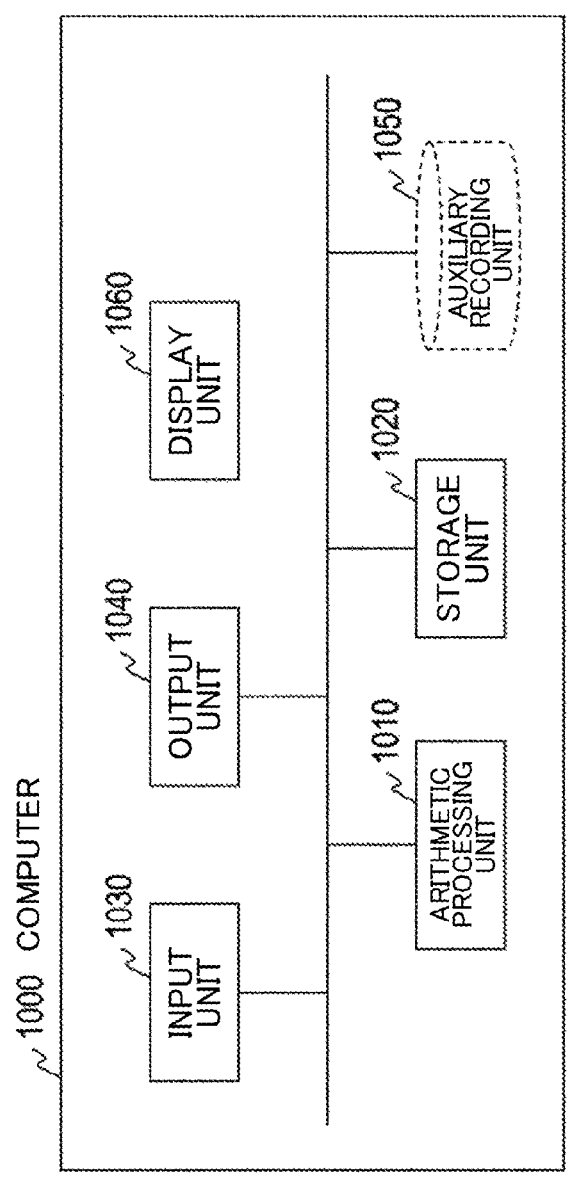
FIG. 9 is a diagram showing an example of a functional configuration of a computer.

When processing of the above-described word evaluation value acquisition device is realized by a computer, processing contents of functions that need to be included in the word evaluation value acquisition device are written by a program. Then, various types of processing functions in each device are realized on the computer by causing this program to be read by a storage unit 1020 of the computer 1000 shown in FIG. 9 and operating an arithmetic processing unit 1010, an input unit 1030, an output unit 1040, a display unit 1060, and the like. The arithmetic processing unit 1010 corresponds to the processing unit 100, the input unit 1030 corresponds to the input unit 200, and the display unit 1060 corresponds to the display unit 300.

A program describing this processing content can be recorded on a computer-readable recording medium. The computer-readable recording medium is, for example, a non-transitory recording medium, and specifically a magnetic recording device, an optical disc, and the like.

The program is distributed, for example, by sales, transfer, or lending of a portable recording medium such as a DVD or a CD-ROM on which the program is recorded. In addition, the distribution of the program may be performed by storing the program in advance in a storage device of a server computer and transferring the program from the server computer to another computer via a network.

A computer executing such a program is configured to, for example, first, temporarily store a program recorded on a portable recording medium or a program transferred from a server computer in an auxiliary recording unit 1050 which is its own non-temporary storage device. When executing the processing, the computer reads the program stored in the auxiliary recording unit 1050 which is its own non-temporary storage device into the storage unit 1020, and executes the processing according to the read program. As another embodiment of the program, the computer may directly read the program from the portable recording medium into the storage unit 1020 and execute processing according to the program. Each time the program is transferred from the server computer to the computer, the processing according to the received program may be executed sequentially. In addition, the processing may be executed by means of a so-called application service provider (ASP) service which does not transfer a program from the server computer to the computer and implements processing functions only by execution instructions and acquisition of the results. It is assumed that the program in this embodiment includes equivalent which is information to be provided for processing by an electronic computer and which is equivalent to a program (e.g., data that is not a direct command to the computer but has the property of defining the processing of the computer).

In addition, although the present device is configured by executing a predetermined program on the computer in this from, at least a part of the processing content may be implemented by hardware.

In addition, changes, alterations or modifications can be made as appropriate without departing from the gist of the present invention.

The invention claimed is:

1. A word evaluation value acquisition method for acquiring, from a user, an evaluation result indicating an index value of a plurality of index values of respective indexes for words, comprising:
   a document display step in which a display displays a document comprising a plurality of sentences, and a sentence of the plurality of sentences comprises one or more words under evaluation;
   iteratively executing at least for respective words of the one or more words under evaluation in the document:
      a word selection reception step in which processing circuitry interactively receives selection of a word included in the document displayed on the display by the user;
      a word evaluation reception step in which the processing circuitry interactively receives, as an evaluation result of the user, an index value of the plurality of index values of an index of a selected word according to the received selection of the word the word selection reception step, wherein the index describes semantic familiarity of the word as appearing in the document to the user, and the index value represents a level of the semantic familiarity of the word as appearing in the document to the user; and
   a decoration step in which the display automatically updates a decoration of an index value corresponding to the evaluation result received in the word evaluation reception step to the selected word and to another word having the same spelling as the selected word in the document, wherein respective index values of the plurality of index values corresponds to a distinct decoration of a word.

2. The word evaluation value acquisition method according to claim 1, wherein
   the distinct decoration comprises at least either one of:
      a decoration of applying different colors allocated to respective index values of the plurality of index values to respective characters of words, or
      a decoration of using different colors allocated to respective index values of the plurality of index values as respective background colors of words.

3. The word evaluation value acquisition method according to claim 1, wherein
   the respective indexes for words represent word familiarities, and
   the plurality of index values represents a plurality of index values with respect to word familiarity.

4. The word evaluation value acquisition method according to claim 1, further comprising:
   a word re-selection reception step in which the processing circuitry interactively receives the selected word or selection of the same word by the user for which the word selection reception step, the word evaluation reception step, and the decoration step have been executed and the decoration has been applied and displayed on the display;
   a word reevaluation reception step in which the processing circuitry interactively receives an evaluation result by the user of which indicates any of the plurality of index values with respect to a re-selected word that is the word whose selection has been received in the word re-selection reception step; and a re-decoration step in which the display updates a decoration to be applied to the re-selected word and further updates a decoration to be applied to a word having the same spelling as the re-selected word in the document to the decoration allocated to an index value corresponding to the evaluation result received in the word reevaluation reception step.

5. The word evaluation value acquisition method according to claim 1, wherein in the decoration step, the decoration allocated to the index value corresponding to the evaluation result received in the word evaluation reception step is further applied to a word corresponding to the selected word and corresponding to a part of speech different from a part of speech of the selected word included in the document.

6. The word evaluation value acquisition method according to claim 4, wherein in the decoration step, the decoration allocated to the index value corresponding to the evaluation result received in the word evaluation reception step is further applied to a word corresponding to the selected word and corresponding to a part of speech different from the part of speech of the selected word included in the document, and in the re-decoration step, the decoration applied to a word corresponding to the re-selected word and corresponding to a part of speech different from a part of speech of the re-selected word included in the document is also updated to the decoration allocated to the index value corresponding to the evaluation result received in the word reevaluation reception step.

7. A word evaluation value acquisition device for acquiring, from a user, an evaluation result indicating an index value of a plurality of index values of respective indexes for words, comprising:

a display displaying a document comprising a plurality of sentences, and a sentence of the plurality of sentences comprises one or more words under evaluation; and processing circuitry iteratively executing, at least for respective words of the one or more words under evaluation in the document:

interactively receiving selection of a word included in the document displayed on the display by the user;

interactively receiving, as an evaluation result by the user, an index value of the plurality of index values of an index of to a selected word according to the received selection of the word, wherein the index describes semantic familiarity of the word as appearing in the document to the user, and the index value represents a level of the semantic familiarity of the word as appearing in the document to the user; and automatically updating a decoration of an index value corresponding to the evaluation result to the selected word and to another word having the same spelling as the selected word in the document, wherein respective index values of the plurality of index values corresponds to a distinct decoration of a word.

8. A non-transitory computer readable medium that stores a program for causing a computer to execute each step of the word evaluation value acquisition method according to claim 1.

* * * * *